Figure 1:
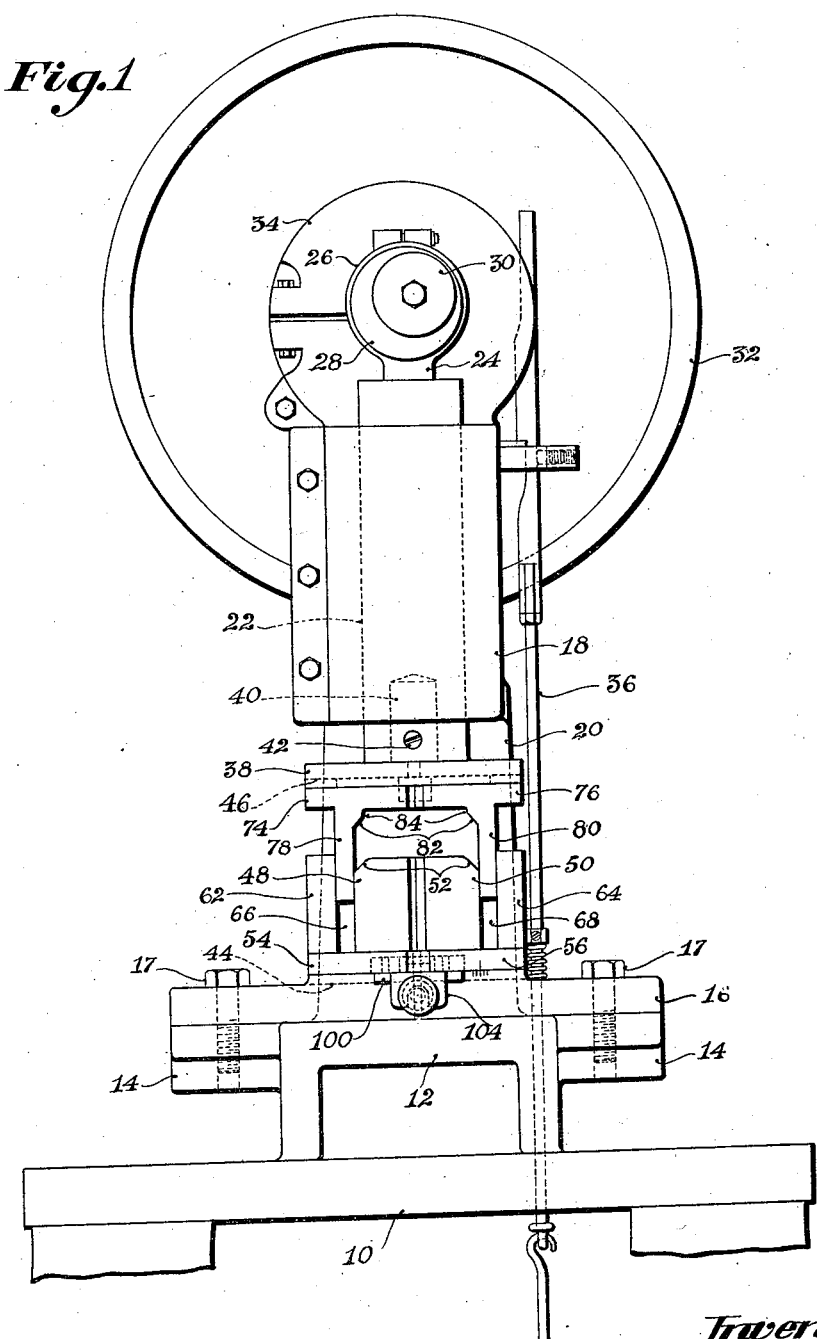

J. W. COSGROVE.
SOLE MOLDING PRESS.
APPLICATION FILED MAR. 16, 1920.

1,407,128.

Patented Feb. 21, 1922.
2 SHEETS—SHEET 1.

J. W. COSGROVE.
SOLE MOLDING PRESS.
APPLICATION FILED MAR. 16, 1920.
1,407,128.
Patented Feb. 21, 1922.
2 SHEETS—SHEET 2.
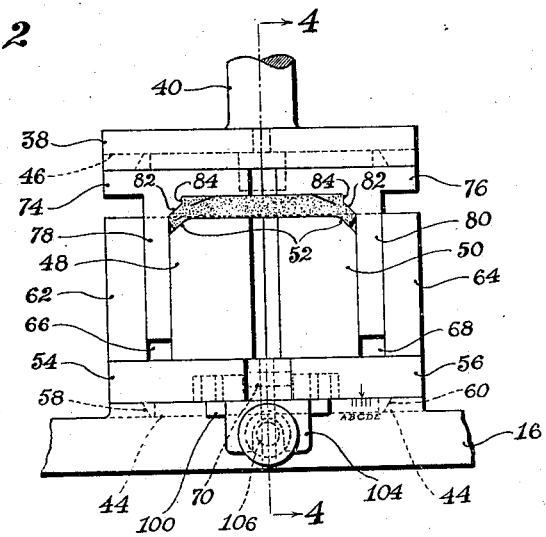
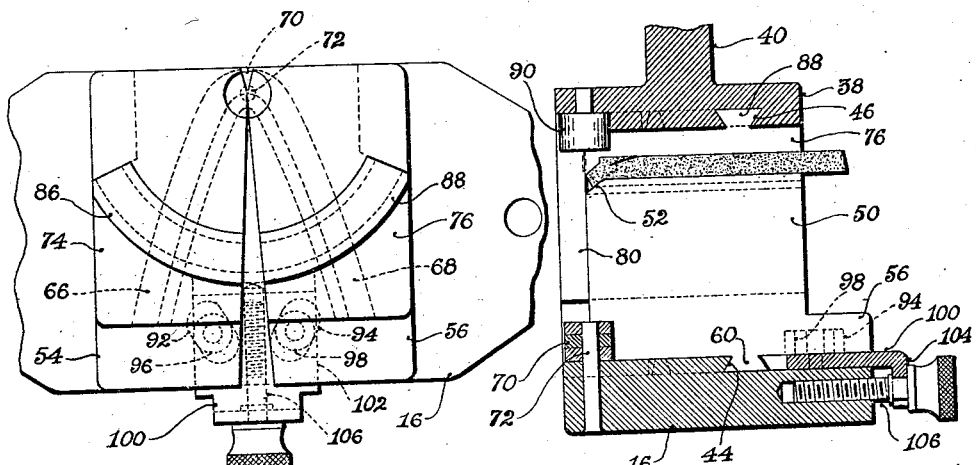
Fig.3
Fig.4
Witness
John J. Ecbery.
Inventor
John W. Cosgrove
by his attorneys

UNITED STATES PATENT OFFICE.

JOHN W. COSGROVE, OF MEDFORD, MASSACHUSETTS, ASSIGNOR TO UNITED SHOE MACHINERY CORPORATION, OF PATERSON, NEW JERSEY, A CORPORATION OF NEW JERSEY.

SOLE-MOLDING PRESS.

1,407,128.

Specification of Letters Patent. Patented Feb. 21, 1922.

Application filed March 16, 1920. Serial No. 366,185.

*To all whom it may concern:*

Be it known that I, JOHN W. COSGROVE, a citizen of the United States, residing at Medford, in the county of Middlesex and State of Massachusetts, have invented certain new and useful Improvements in Sole-Molding Presses; and I do hereby declare the following to be a full, clear, and exact description of the invention, such as will enable others skilled in the art to which it appertains to make and use the same.

This invention relates to presses for molding soles and more particularly to such machines for molding or breaking down the margins of soles for turn shoes. The machine is designed for performing the specific operation of molding the margin about the toe end of a turn sole, the molding of the remainder of the margin being performed on another machine.

Heretofore it has been the practice to break down the margins of turn soles by a machine which feeds the margin of the sole progressively past the molding tools such, for example, as the Goodyear power molding machine disclosed in Letters Patent of the United States to William C. Meyer No. 1,110,637, granted September 15, 1914. It has been found to be difficult to feed, through a machine of this type, the extremely pointed toes on the soles now in vogue, commonly called "peaked toe" soles, without distorting the toe and thus spoiling the lines of the shoe when finished.

In a co-pending application of Frank E. Beckman, Serial No. 366,265, filed March 16, 1920, a novel press for eliminating the danger of distortion is described which provides a mold couple for breaking down the margin of a turn sole by a sustained pressure applied about the toe end only. In the Beckman machine the mold couples are interchangeable for width and style. When an adjustment is required it necessitates stopping the operation of the machine for an appreciable period to permit the removal of one mold couple and the substitution of another.

An object of the present invention is to provide for a substantially instantaneous adjustment for width in a press of the character referred to, and thus render the operation of the machine practically continuous when operating upon case lots of soles. Much time is thus saved and the output of the machine materially increased.

Accordingly an important characteristic of the invention is found in the construction of the mold couple for breaking down the margin about the toe. This mold couple comprises a male and female mold generally of the Beckman type, each of which, however, is made in two parts or halves mounted for articulated movement about a center at the tip of the toe. The two molds are so interconnected that an adjustment, i. e., an opening or closing about the tip of the toe as a center, of one compels an equal adjustment of the other. When it is considered that the toe ends of peaked toe soles are substantially triangular in plan, it will be understood that the adjustment described will accurately provide for a large number of widths without necessitating a removal of the mold couple from the machine.

To the accomplishment of this object and such others as may hereinafter appear, as will be readily understood by those skilled in the art, the invention comprises the features and combination of parts hereinafter described and then particularly pointed out in the appended claims.

The features of the invention will be best understood from a description of the preferred embodiment thereof illustrated in the accompanying drawings, in which:

Figure 1 is a front elevation of the working parts of the machine; Fig. 2 is a front elevation of the mold couple with the toe end of a turn sole being molded between the two molds; Fig. 3 is a plan of the mold couple detached from the operating plunger of the press with the upper sustaining block removed; and Fig. 4 is a vertical, longitudinal section on the line 4—4 of Fig. 2.

In the embodiment of the invention illustrated in the drawings the sole molds have been applied to a press of the type disclosed in Letters Patent of the United States to Lorenzo P. Hawkins, No. 514,364, granted February 6, 1894. As in the machine of said Hawkins patent a table 10, supported at a convenient height, is provided with a base block 12 having oppositely disposed ears 14. The lower or male mold block 16 is removably secured to the base block by screws 17 threaded into definitely located receiving bores in the ears 14.

Above the mold block 16 is a vertical bearing 18 carried at the forward end of the overhanging frame 20 which rises from the table at the rear end of the base block 12. A plunger 22 is fitted to slide in this bearing, to the upper end of which is suitably jointed the rod 24 of an eccentric strap 26 embracing an eccentric 28 on the forward end of a power shaft 30 driven by a pulley 32. Two journals for the shaft 30 rise from the frame 20 of which the forward one 34 only is shown. The revolution of the shaft 30 is controlled by a clutch (not shown), operated by a treadle attached to the treadle rod 36, designed to provide for a sustained pressure on the sole placed between the molds as is common to presses of this general type.

The upper or female mold is secured to a sustaining block 38 which is provided with a centering pin 40 fitting within a bore in the plunger 22 and is thus definitely positioned with relation to the lower or male mold block 16. The block 38 is secured to the plunger in any convenient manner as by a set screw 42.

The mold supporting blocks 16 and 38 are provided respectively with arcuate dovetail ways 44 and 46 the centers of which are at the tip of the toe of the mold couple. These ways form tracks for guiding the movement of the separately formed halves of the upper and lower molds during adjustment thereof.

The lower or male mold is formed in two halves 48 and 50, one complemental to the other, and together forming a sole supporting surface generally triangular in plan, the upperside edges of which are beveled as at 52 to form oblique sole margin engaging walls.

The male mold halves 48 and 50 rise from base portions 54 and 56 which are provided on their under faces with dovetail ribs 58 and 60 shaped to fit and slide in the lower way 44. Outside the male mold halves 48 and 50, and integral with the base portions, are two outer members 62 and 64 the inner surfaces of which are parallel to the outer surfaces of the male mold halves but spaced therefrom to form vertical slots 66 and 68.

The movable parts thus far described are connected by a hinge 70, of usual form, the pintle 72 of which has its axis at the tip of the toe end of the mold as shown in Figs. 3 and 4.

The upper or female mold is also formed in two separate halves 74 and 76, one complemental to the other and having depending legs 78 and 80 respectively which are so shaped as to slidingly fit the two slots 66 and 68. Each female mold, within its depending leg, is provided with oblique side walls 82 to engage the margin of the sole and vertical side walls 84 to engage the shoulder of the sole. The female mold halves are provided with dovetail ribs 86 and 88 shaped to fit and slide in the upper way 46. A cylindrical pin 90 is secured in the lower face of the upper mold block 38 with its center above the axis of the hinge pintle 72, the female mold halves being cut away at their rear corner to partially embrace it (see Fig. 3). It will be observed that the construction just described provides for a simultaneous movement of both the male and female mold halves at either side of the mold couple when either the upper or lower mold is adjusted.

In order to effect an adjustment of the mold couple to provide for molding soles of different widths, an adjusting plate is provided having a connection with both of the male mold base portions 54 and 56. These portions are provided with an oblique slot 92 and 94 (Fig. 3) into which take rolls 96 and 98 carried by a sliding plate 100 seated in a way 102 formed in the mold block 16. The plate 100 has a down turned ear 104 slotted to receive the stem of an adjusting screw 106 threaded into the block 16. Collars on the screw insure a movement of the plate 100 and consequently of the rolls within the slots, in one direction or the other, when the screw is turned. It will be obvious that if the plate 100 is moved outward the mold halves, both male and female, are moved apart, and if moved inward they will be drawn together, angularly about the hinge 70 and pin 90 as an axis.

The throw of the eccentric 28 is not so great as ever to withdraw the legs 78 and 80 from the slots 66 and 68, hence the oblique female mold wall 82 is always maintained in proper margin molding relation to the oblique male mold wall 52.

In using the press the operator thrusts the toe end of a sole into the opening between the horizontal surfaces of the molds at a time when the plunger 22 is withdrawn, the inner surfaces of the legs 78 and 80 being in contact with the outer surface of the male mold forming an accurate gage for the edge of the sole to correctly center it between the members of the mold couple. The clutch is then thrown in and the female mold descends gripping the margin of the sole between the oppositely disposed oblique side walls and forcing the shoulder within the recess formed by the mold walls 84 as shown in Fig. 2. Adjustment for width is quickly effected by the screw 106, a scale, as usual, being provided for accuracy.

Those skilled in the art will recognize that some features of the invention are not limited to a mold couple having the adjustment for width which forms the principal feature, but may be employed in any mold couple for breaking down the margin at the toe end of the turn soles.

The nature and scope of the present invention having been indicated and the preferred embodiment of the invention having been specifically described, what is claimed as new, is:—

1. A turn sole molding machine having, in combination, a mold couple, means for adjusting the members of said mold couple to accommodate soles varying in width, and means for exerting a margin molding pressure on a sole between the adjusted members of said couple.

2. A press for molding the margin at the toe end only of peaked toe turn soles having, in combination, a mold couple comprising male and female members generally triangular in plan and open at one side to permit the body of the sole to extend therethrough, means for varying the widths of the members at said open sides to receive soles varying in width, and means for causing relative approach of the members of said couple after adjustment.

3. A press for molding the margin at the toe end only of peaked toe turn soles having, in combination, a mold couple comprising male and female members generally triangular in plan and open at the base to permit the body of the sole to extend therethrough, said couple being split centrally to form complemental separate halves, a pivotal connection between said halves having its axis at the tip of the toe, means for moving said mold halves relatively about said axis, and means for causing relative approach of the members of said couple.

4. A turn sole molding machine having, in combination, a mold couple comprising male and female members shaped to break down the margin of the sole, said couple being split centrally to form complemental separate halves, means connected with one of said members to adjust its halves for soles varying in width, and means for transmitting said adjustment to the other member.

5. A turn sole molding machine having, in combination, a mold couple comprising interconnected male and female members shaped to break down the margin of the sole, each member being split centrally to form complemental separate halves, and a single means for opening and closing the halves of both members for adjusting the couple to accommodate soles varying in width.

6. A press for molding the margin at the toe end of peaked toe turn soles having, in combination, a mold block sustaining a male mold generally triangular in plan and side blocks spaced from said mold to form slots parallel to the side walls thereof, a second mold block sustaining a female mold shaped to co-operate with the male mold in breaking down the margin and provided with legs arranged to form a sliding fit within said slots, whereby the two molds may be guided in their movements relative to each other, and means for effecting said movements.

7. A press for molding the margin at the toe end of peaked toe turn soles having, in combination, a mold couple comprising male and female members generally triangular in plan, a mold block for sustaining each member of said couple, said blocks having a tongue and groove connection for guiding them in their movements relative to each other, and means for effecting said movements.

8. A press for molding the margin at the toe end of peaked toe turn soles having, in combination, a mold couple comprising male and female members generally triangular in plan and open at the base, one of said members having side walls the inner surfaces of which continually contact the outer surfaces of the side walls of the other member providing a sole edge gage for positioning a sole relatively to the members of said mold couple, and means for causing a relative approach of the members of said couple.

9. A molding machine for breaking down the margin at the toe end only of previously shouldered turn soles having, in combination, a female mold shaped to receive the toe end of the sole having a wall to fit about the shoulder thereof; a male mold opposite the female mold to engage the grain side of the sole; said molds having co-operating oblique margin molding walls; means for adjusting the width of said molds; and means for causing relative approach of said molds to shape the margin of the sole by pressure between said oblique walls.

10. A molding machine for breaking down the margin at the toe end only of previously shouldered turn soles having, in combination, a female mold generally triangular in plan and open at its base, the side walls of which comprise vertical shoulder engaging portions and oblique margin engaging portions; a male mold, also generally triangular in plan, having oblique margin engaging side walls adapted to be seated within the oblique side walls of the female mold, means for varying the angularity of said side walls to each other to accommodate soles varying in width; and means for causing relative approach of said molds to shape the margin of the sole by pressure between said oblique walls.

JOHN W. COSGROVE.